Sept. 22, 1959 H. SCHICHT 2,904,934
GEAR LAPPING APPARATUS
Filed May 25, 1956 3 Sheets-Sheet 1
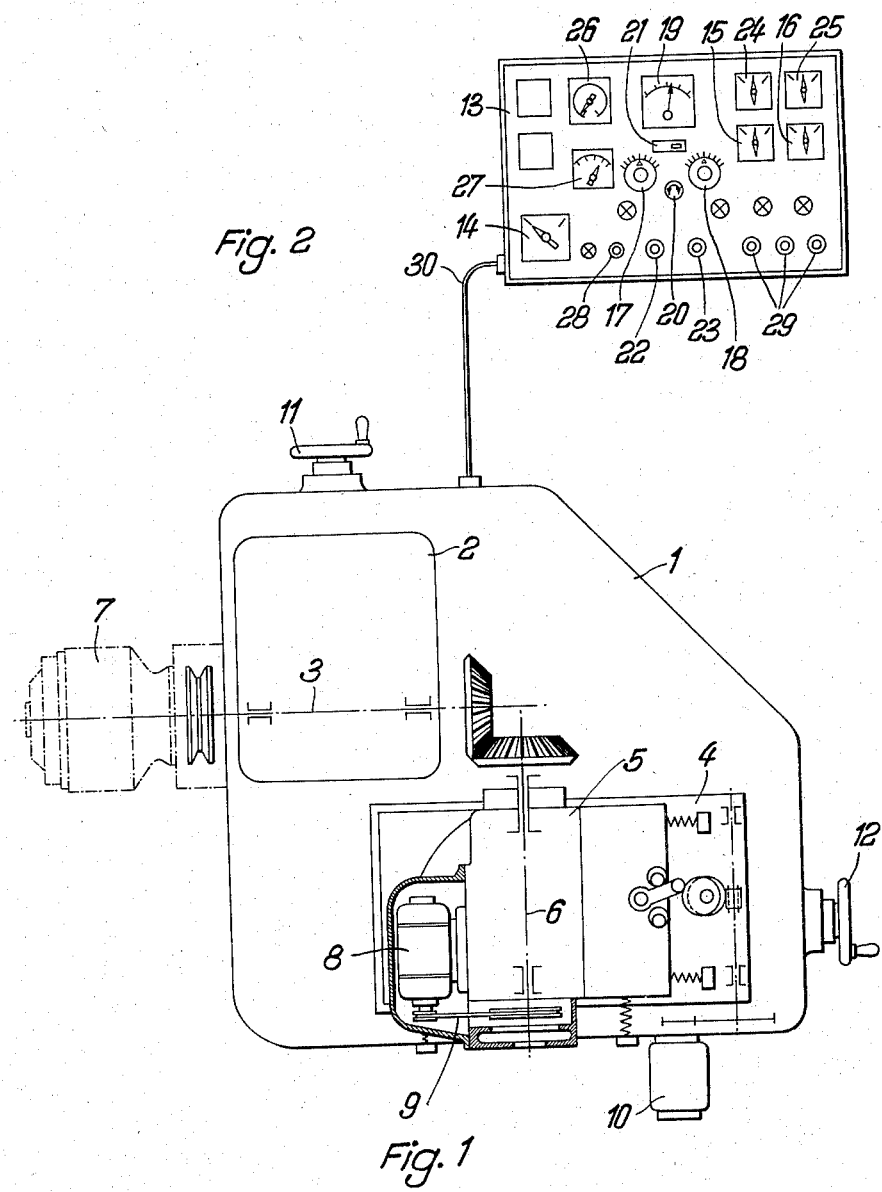
Inventor:
HEINRICH SCHICHT
ATTORNEYS Sept. 22, 1959  H. SCHICHT  2,904,934
GEAR LAPPING APPARATUS Filed May 25, 1956  3 Sheets-Sheet 2

Inventor:
HEINRICH SCHICHT

Mead, Browne, Schuyler & Beveridge
ATTORNEYS

United States Patent Office 2,904,934
Patented Sept. 22, 1959

2,904,934

GEAR LAPPING APPARATUS

Heinrich Schicht, Huckeswagen am Rhineland, Germany, assignor to W. Ferd. Klingelnberg Sohne, Remscheid-Berghausen, Germany, a corporation of Germany Application May 25, 1956, Serial No. 587,260

Claims priority, application Germany May 27, 1955

11 Claims. (Cl. 51—26)

This invention relates to an apparatus for lapping the teeth of a gear to obtain desired contact characteristics, and more particularly to an automatically controlled gear lapping apparatus.

Gears installed in drive units are liable to displacement from their theoretical mounting position to greater or lesser extent as a result of unavoidable inaccuracies, backlash and the flexible deformation in housings and bearings. A further detrimental factor may be errors due to machining. These factors are allowed for in the manufacture of the gears, in particular in those cases where some amount of flexibility is to be expected, e.g., in vehicle rear axles. The gears are made to provide flank contact over a limited area only and not over their full length and depth. The correct form, position and size of this area, described as bearing, is already aimed at when cutting the gears from the soft blank. Small errors in the machine setting and the unavoidable distortion of the gears as a result of hardening cause variations from the ideal theoretical form which require correction. This correction must be effected by lapping which is thus more than merely a means of improving the surface of the gear flanks. It is, therefore, necessary that the lapping operation can also influence the form of the tooth flanks to create the correct bearing.

Several designs of lapping machines are in existence which attempt to provide a solution of the rather difficult problem created by the sliding conditions resulting from the rolling motion on the tooth flanks. These machines operate as a rule with several movements which are additional to the rolling motion of the gears, whereby always one and the same gear, normally the pinion, is driving and the direction of rotation is periodically reversed.

The new feature of the lapping machine representing the subject of this invention is that both spindles can effect the drive in either direction. This method of operation is based on the realization that both the natural wear as well as the lapping of gears always causes the maximum metal removal on those flank zones of the meshing gears which are within the sphere of "push" sliding. "Push" sliding is found on those flanks which are in engagement before the rolling point, i.e., on the dedendum flank of the driving and addendum flank of the driven gear. If the bearing on the flank of one gear of a pair of mating gears is too low, i.e., too far toward the roof, this gear must be made the driving member during lapping, in the direction of rotation in which this flank is in contact. The push sliding resulting at the dedendum flanks and meshing addendum flanks causes increased metal removal at these areas and consequent displacement of the bearing in an upward direction. The simple rule, therefore, applies:

During the lapping of a pair of gears, that gear must always be the driving one on whose flanks the bearing is to be shifted from dedendum to addendum, that is to say, upward. The application of this rule calls for a design of lapping machine where either spindle can be the driving member in either direction.

The second factor which decisively influences the lapping effect apart from the nature and extent of the sliding motion, is the pressure of the flanks against one another during lapping, briefly termed lapping pressure in the text following. The sensitive and dependable setting of the lapping pressure to adapt the lapping effect to the surface condition of the flanks, the nature and displaceability of the bearing prior to lapping, the efficiency of the lapping grain which is progressively reduced as a result of wear, etc., are all important factors. It is generally known and common to produce the torque governing the lapping pressure by braking the spindle carrying that gear which is driven by the meshing gear on the other driving spindle. The brake used can take the form of a friction brake or a hydraulic brake; the brake can, of course, also be electric, i.e., through a brake dynamo.

On the new lapping machine, one spindle—the pinion spindle in the case of a bevel gear lapping machine—is driven by a constant-speed pole-changing squirrel cage motor (main motor). The second spindle (crown wheel spindle) is driven by a D.C. generator having an output which is small compared with the main motor. The generator speed is controlled through an electronically-operated Ward-Leonard set. This small D.C. generator is described as lapping pressure motor in the text following. If the lapping pressure motor is set so that, with the gears out of mesh, the crown wheel spindle would be given a slower speed than transmitted from the pinion spindle (synchronous speed) through the mating gears, then the pinion is driving. If, on the other hand, the lapping pressure motor is set so that it transmits a speed to the crown wheel spindle which is higher than the synchronous speed, then the crown wheel is driving.

The effect is a change in the flank contact with unaltered direction of rotation. The extent of the braking and acceleration torque of the lapping pressure motor is proportionate to the requisite ideal difference in the speed. The lapping torque producing the flank pressure on the gears is, however, also affected by the friction in the drive and in the bearings of the crown wheel spindle. In the case of the driving pinion it is necessary to transmit through the tooth engagement not only the braking torque of the lapping pressure motor but also the friction element of the crown wheel spindle. The lapping torque in this instance thus equals the sum of the motor braking torque and the frictional torque of the crown wheel spindle. If, on the other hand, the crown wheel is driving, the lapping pressure motor must overcome the frictional torque of the crown wheel spindle. In this case the lapping torque equals the difference between the driving torque of the lapping pressure motor and the frictional torque of the crown wheel spindle. When setting equal acceleration or retardation torques of the lapping pressure motor with both types of drive (pinion or gear driving) the lapping torques would thus differ by twice the frictional torque. On the new machine this setting is effected before the lapping operation is started, i.e., before the gears are in mesh the crown wheel spindle speed is set to the synchronous value resulting from the pinion spindle speed and the transmission ratio. The indicator for the lapping torque is set to zero at this synchronous speed. If the speed is varied during lapping from this zero position in either direction, the same lapping torques will be obtained for the driving pinion or driving gear with identical indication. It is, of course, also possible to set torques of different magnitude for the drive through pinion or gear. The result is an extremely fine variability of the lapping torque, due to the low output of the lapping pressure motor, entirely independent of the frictional torque.

The speed range of the lapping pressure motor is best so arranged that with a ratio of 1:1 to 1:10 of the pair of gears to be lapped the resultant lapping torque is still adequate. As both the main drive motor and lapping pressure motor are reversible, and the regulation of the latter is equally effective in either direction, it is possible to arrange either spindle as driving or driven member in either direction, as previously mentioned.

The initial direction of rotation and the drive—pinion or gear driving—can be preselected before the start of the lapping operation. The lapping cycle is automatically controlled by generally known accessories. The intervals at which either the direction of rotation or the drive is to be reversed can be set on an intermittent timer. An adjustable total lapping period timer stops the machine when the total machining time has elapsed.

The new lapping machine, if arranged for bevel gears, features only one additional movement, performed by the crown wheel workhead principally in the direction of the common pitch cone generator of gear and pinion, i.e., in the crown wheel plane. The guideways of the workhead can for the purpose be swivelled in the direction of the crown wheel plane around an axis at right angles to their plane.

The specimen design of a bevel gear lapping machine based on the principles of the invention is described in greater detail in the text following.

Accordingly, it is an object of this invention to provide a gear lapping apparatus in which the gear lapping cycle may be automatically controlled.

It is a further object of this invention to provide a gear lapping apparatus in which either gear of a pair of gears being lapped may selectively be made the driving gear in either direction of rotation and in which a predetermined lapping pressure may be automatically maintained.

Further objects and advantages of the invention will become apparent from the following description taken in conjunction with the accompanying drawings, in which:

Fig. 1 is a plan view of the apparatus of the invention;

Fig. 2 is a front elevation view of the control panel on the electric switch gear cabinet;

Figure 3:
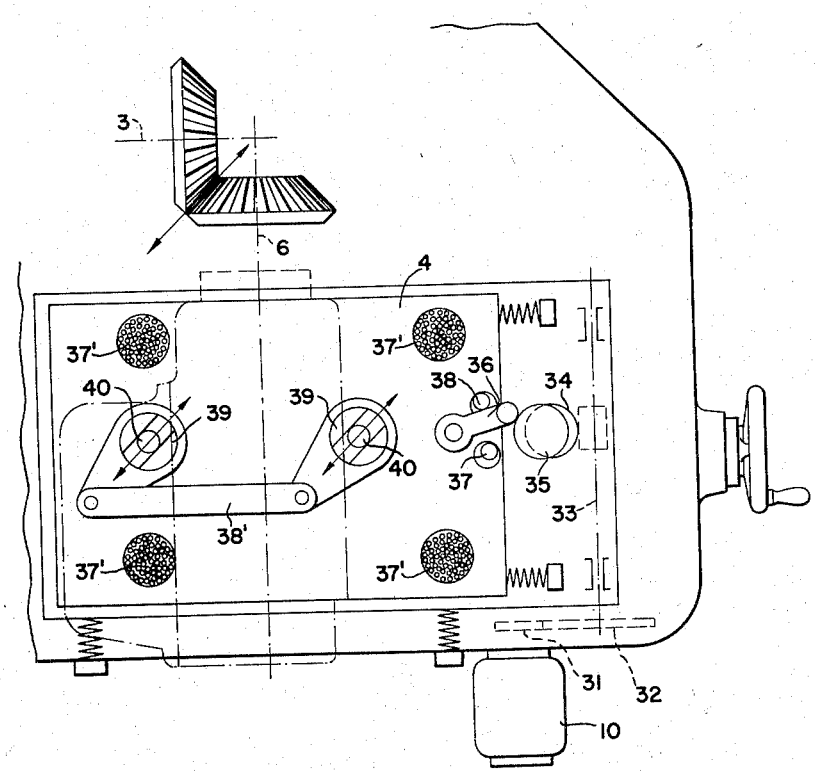
Fig. 3 is a plan view showing the general arrangement of the guideways for the crown wheel workhead.

The box-section base 1 of the lapping machine for bevel gears carries a guideway—not shown—on which a workhead 2 with work spindle 3, indicated by their center line, is mounted. A second guideway at right angles to the first—likewise not shown—carries the saddle 4 on which a workhead 5 with a second work spindle 6 is mounted in a way described in detail later on. The spindle 3 is driven through a V belt by a pole-changing squirrel cage motor 7, the main drive motor. The spindle 6 is driven through a V belt 9 by a small D.C. motor 8, hereafter called the lapping pressure motor, mounted on the workhead. A motor 10 produces the additional motion. 11 and 12 are two handwheels controlling the adjustment of the workheads when setting up the machine. The drive of the additional movement is derived from the motor 10 through the gears 31, 32, the shaft 33 and the worm 34 to an eccentric disc 35. The movement is thence transmitted through a dog 36 to the workhead 5. The position of the workhead stroke is governed by adjustable stops 37 and 38. Depending on the direction of rotation of the eccentric disc 35, the dog 36 rests against one or the other stop. When reversing the motor 10 and at the same time the pair of gears to be lapped (motor 7), or when altering the drive (from pinion to gear, or vice-versa), it is possible to lap the pull or push flanks of the gears with equal or different spacings, according to the setting of the stops 37 and 38.

The workhead 5 is mounted on ball tracks 37' on the saddle 4 and can be swivelled in all directions.

Two guides 39 which can be set jointly through the medium of a coupling rod 38', and in which the two pivots 40 engage, govern the direction of the stroke of workhead 5. The guides are normally so set that the additional movement takes place in the direction of the common pitch cone generator, i.e., the crown wheel plane or at a certain angle to said plane. The cabinet 13 connected with the machine through the cable 30 houses the electrical switchgear, while all switches and indicating equipment for the control of the machine are grouped on the top of the pulpit-shaped cabinet. The various elements marked by numbers are: main isolator switch 14, pole-change switch 15 for main drive motor, selector switch 16 for changing the direction of rotation or the drive through the intermittent timer, knob 17 on the potentiometer for varying the lapping pressure of the driving pinion, ditto 18 for the driving gear, lapping torque indicator 19, zero setting knob 20 for 19, switch 21 for changing from motor-driven to generator-driven operation of the lapping pressure motor, push buttons 22 and 23 for selecting the drive at the start of the operation (pinion or gear driving), lapping pump switch 24, switch 25 controlling the direction of the additional lapping movement, total lapping period timer 26, intermittent timer switch 27, push button 28 for 26 and 27, push buttons 29 for hand control.

Figure 4:
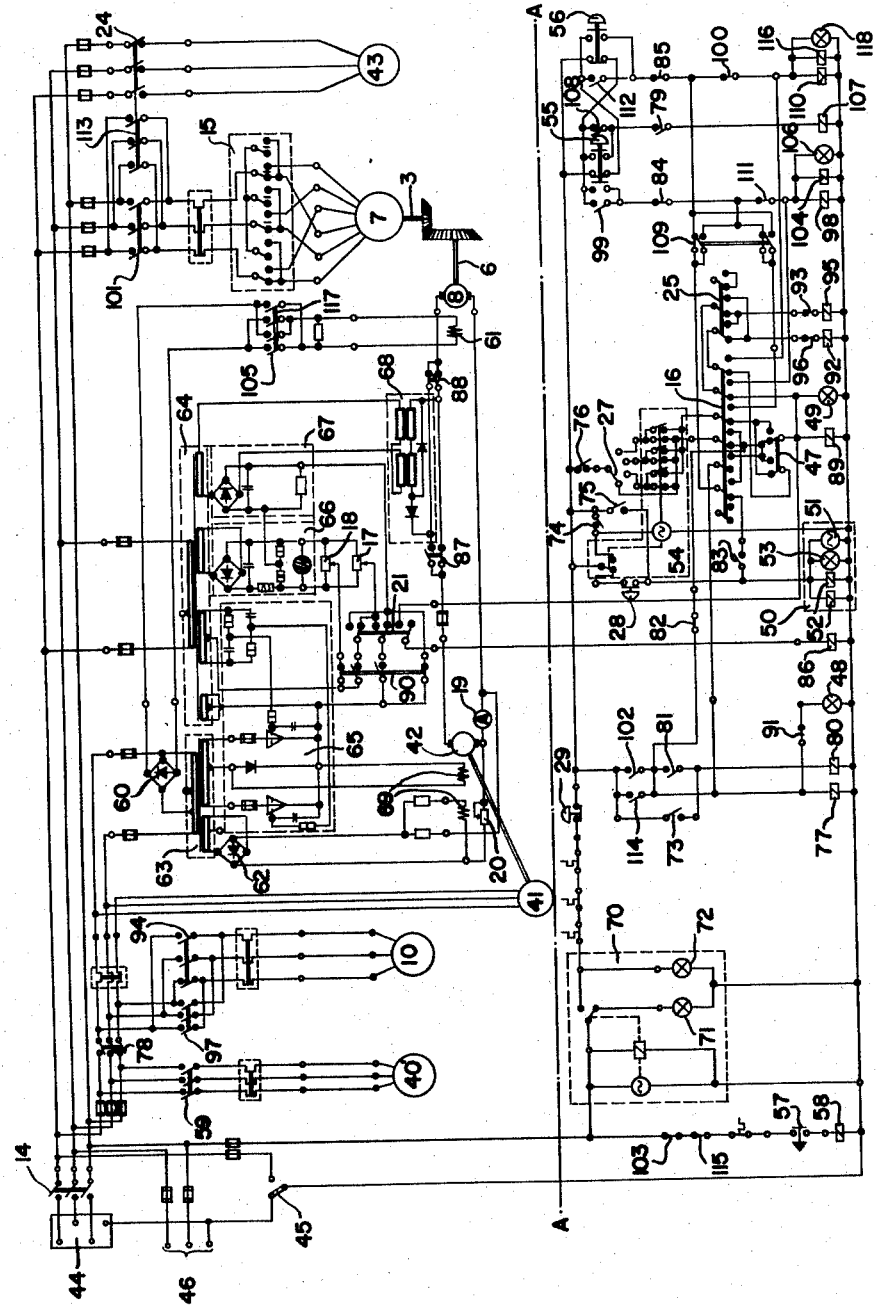
Fig. 4 shows the electrical control circuit for the apparatus.

The kinematic diagram (Fig. 4) shows: the pinion spindle 3, the crown wheel spindle 6, the main drive motor 7, the lapping pressure motor 8, the motor 10 for the additional movement, the driving motor 40' of a hydraulic pump which is not shown, the motor 41 and generator 42 of the Ward-Leonard set, and the driving motor 43 of a lapping pump which is likewise not shown. Other elements are: the terminal 45 for changing from 220 to 380 volts mains supply, the terminal 46 for a lighting attachment, etc.

Numeral 15 is the pole-changing switch for the main drive motor 7, 16 the switch for selecting whether the intermittent timer 54 is required to change periodically the drive (pinion or gear driving) or the direction of rotation. Numerals 17 and 18 are the potentiometers for setting the lapping torque with the pinion driving or gear driving respectively, and 19 is the indicating unit (ammeter) for the lapping torque. Numeral 20 is the zero compensating potentiometer for the ammeter 19 for friction compensation. Numeral 21 is the switch for changing from motor-driven to generator-driven operation of the lapping pressure motor 8. Numeral 24 is the switch for the lapping pump motor 43, and 25 is a preselector switch for the direction of rotation of the motor 10 and the additional movement. Numeral 47 is a push button controlled selector switch for the drive (pinion or gear driving). Numeral 28 is the "start" push button for the automatic cycle with the total lapping period timer 50 and the intermittent timer 54. The timer 50 is connected with the motor 51, the contactors 52 and the indicator lamp 53 which lights up when the timer is engaged. The contactors 52 actuate the contacts 73, 74, 75 and 76. Numeral 29 is a "stop" push button for the entire machine. Numeral 27 is a setting switch for the intermittent timer 53; 55 and 56 are push button switches controlling forward and reverse of the main drive motor 7, the lapping pressure motor 8 and the motor 10 for the additional movement. These push buttons are numbered 29 in Fig. 2. Numeral 57 is a limit switch which is actuated by the pinion workhead 5 when in the withdrawn position, thus engaging the hydraulic pump motor 40' through a contactor 58 and contact 59. The hydraulic oil delivered by the pump releases the gears which are clamped by springs in any other position of the workhead 5. Numeral 62 is a rectifier producing the direct current for the zero setting of the lapping torque ammeter 19 during friction compensation. Numerals 63 and 64 are transformers, 65 a tube rectifier with two grid-controlled rectifier tubes (thyratrons).

Numeral 66 is a one-wave rectifier with a current stabilizer tube for producing a constant direct current. Numeral 67 is a one-wave rectifier supplying a direct current controlled by the armature direct current of the lapping pressure motor 8 through the transductor 68.

Numeral 69 is the field winding of the Ward-Leonard generator 42 consisting of one constant and one variable field. Numeral 70 is a time-lag relay for the heating time of the rectifier tubes in the tube rectifier 65 with one indicator lamp 71 ("Heating") and a second indicator lamp 72 ("Ready to operate"). Numeral 77 is a contactor which actuates the contacts 78 for engaging the rectifier and regulator elements shown above the line AA in the diagram. This contactor also actuates the contact 79. Numeral 80 is a contactor, which starts the automatic operation of the machine as described in detail later on. The contactor 80 operates the contacts 81, 82, 83, 84 and 85. Numeral 86 is a contactor which keeps constant the direction of the current in the transductor 68 when changing from motor-driven to generator-driven operation of the lapping pressure motor 8 whereby the armature current is reversed. The contactor 86 actuates the contacts 87 and 88. A contactor 89 effects the change in the drive through the contact 90, i.e., changing from a driving pinion to a driving gear, and vice-versa. The contact 91 of the indicator lamp 48 is actuated at the same time. Numerals 92 and 95 are reversing contactors for the motor 10 of the additional movement: the contactor 92 operates the contacts 93 and 94; the contactor 95 the contacts 96 and 97. Numerals 98 and 110 are reversing contactors for the main drive motor 7. Contactor 98 actuates the contacts 99, 100, 101, 102 and 103, while contactor 110 actuates the contacts 111, 112, 113, 114 and 115. Numerals 104 and 116 are reversing contactors for the lapping pressure motor 8 operating the contacts 105 and 117. Numerals 106 and 118 are indicator lamps for forward and reverse of the main drive motor 7, the lapping pressure motor 8 and the motor 10. Numeral 107 is a contactor which actuates the contacts 108 and 109 for reversing the main drive motor according to the preselection effected by the push button switch 55. Resistances, condensers, fuses, overload relays and the individual connecting wires are not specially marked.

The operation of the illustrated driving and control elements is explained by the following description of an operating sequence. When the main switch 14 is engaged, the heater relay 70 for the rectifier tubes is instantly under current, as shown by the lighting up of the indicator lamp 71. When the required heating period has elapsed, the relay automatically switches to "ready for operation," which is shown by the lighting up of the lamp 72. The type and sequency of the lapping operation is in the meantime fixed by the setting of the various controls. The total running time of the machine until the automatic cut-out is set by the knob on the dial 26 of the total lapping period timer 50. By pressing the requisite push button on the selector switch 47 it is possible to preselect whether the gear or pinion is driving at the start of the lapping operation. Depending on the position of the switch, one of the two indicator lamps 48 or 49 lights up when the machine is engaged. The switch position shown represents the position for a driving pinion. The selector switch 16 is used for preselecting whether the intermittent timer 54 is to change the drive or direction of rotation at certain intervals. The switch position shown represents the position for the change of the drive. The switch 27 serves for setting the interval after which the intermittent timer 54 is to effect the preselected change over. The switch 25 preselects the direction of the additional movement, i.e., the initial direction of rotation of the corresponding motor 10.

The variation of the lapping torques by means of the potentiometers 17 and 18 must be carried out while the machine is running.

One of the push buttons 55 or 56 is pressed for the purpose, e.g., button 55 for reverse. The contactors 98 and 104 are thereby put under current. The contactor 98 closes the contact 99, opens contact 100, closes contacts 101 and 102, and opens contact 103. The contactor 104 closes the contacts 105 and thus determines the rotation of the lapping pressure motor 8 for the clockwise running of the gear. As the contact 99 is closed, the indicator lamp 106 (reverse) receives current, and lights up. The opened contact 100, on the other hand, interrupts the circuit to the contactors and the indicator lamp for forward rotation. The main drive motor 7 receives current through the contacts 101 and starts up for anti-clockwise rotation (reverse) of the pinion. The contactors 77 and 89 receive current through the closed contact 102, while either contactor 92 or 95 receives current, depending on the position of the switch 25. The contactor 77 closes the contacts 78 and thereby connects the rectifier side with the mains. In addition, the contactor 77 closes the contact 79. In the illustrated position of the switch 25 the contactor 95 receives current, opening the contact 96 and starting the motor 10 through the contact 97. The contactor 89 reverses the contact group 90, i.e., it opens the two closed contacts and closes the open ones. The potentiometer 17 controlling the lapping torque is then connected into the regulator circuit, with the pinion driving. The contactor 89 at the same time opens the contact 91 for the indicator lamp 48, while the lamp 49, indicating the pinion drive and arranged in parallel with the contactor 89, is under current and lit up. Before it is possible to set the lapping torque by the potentiometer 17, the friction element of the gear spindle 6 must be compensated for in the way previously described. The potentiometer 17 is then used for regulating the speed of the lapping pressure motor 10 before the gears are in mesh in the way described later on, so that the speed of the gear spindle 6 is equal to that of the pinion spindle 3 and the ratio of the mating gears.

This setting can be checked on a spindle speed indicator which is coupled to the gear spindle, but not shown in the drawings. The resultant reading of the indicator 19 at this gear speed corresponds to the friction in the gear spindle. This pointer deviation is then returned to zero by creating an equally high counter electromotive force on the instruments by means of the potentiometer 20. The friction element is thus compensated for and the pointer movement on the indicator denotes the actual lapping torque during the setting described below.

The setting effects the following: an alternating current is taken from one winding of the transformer 64, while its share in the rectifier 67 is made proportionate to the armature current of the lapping pressure motor 8 through the transductor 68. The rectified current from the rectifier 67 is compared with a direct current which is produced by the rectifier 66, stabilized and variable by the potentiometer 17, 18. The differential current controls the tube rectifier 65 and thus the current supplied by the rectifier to the field winding 69 of the Ward-Leonard generator 42. The field excitation of the Ward-Leonard generator governs the current delivered to the armature in the lapping pressure motor 8, producing the lapping torque at the requisite working speed, which can be checked in the way described above on the compensated indicator 19. The regulator circuits are so arranged that the set lapping torque remains constant to a high degree of accuracy.

As long as the lapping torque to be set for pinion drive is still smaller than the compensated friction of the gear spindle 6, the lapping pressure motor is still motor-controlled. If a lapping torque is to be set which is greater than the friction element, the motor must be set to generator drive by the switch 21 so that its brake factor is added to the friction element of the gear spindle. Operating the switch 21 changes the poles of the differential current from rectifiers 66 and 67 relative to the tube rectifier 65.

The contactor 86 is at the same time put under current and actuates the contacts 87 and 88. The direction of the current in the transductor remains unchanged notwithstanding the reversal of the armature current in the lapping pressure motor. Whereas in the position "motor drive" of the switch, a negative current difference of the regulator current in the potentiometer 17 causes an increase in the field excitation of the Ward-Leonard generator 42 and thus a rise in the armature current in the lapping motor 8 and the lapping torque produced, the change to "generator drive" weakens the generator field of generator 42 and thus the counter-electromotive force induced in the generator relative to the current induced in the armature of the lapping motor now acting as generator. The armature current in the lapping motor therefore again increases and the resultant braking torque rises. The current in the rectifier 67 influenced by the armature voltage through the transductor 68 is thereby increased, and the control current difference is reduced until the torque regulated by the potentiometer 17 is obtained.

The gears must be brought into mesh for the setting of the lapping torque. If the gear is to be the driving member, it is necessary to set the switch 47 to the position "gear driving." The contactor 89 and the indicator lamp 49 are without current, the contactor is released and returns the contacts 90 and 91 to the position shown. The lamp 48 lights up and denotes that the gear is now driving. The contactor 95 is at the same time without current and is released, causing the contacts 96 and 97 to return to the position shown. The contactor 92 is thereby under current, opens the contact 93 and connects the motor 10 for the additional movement to the mains through the contacts 94. The motor runs in the opposite direction causing both a change in the flank contact, as described above, and an alteration of the stroke of the additional movement.

The return of the contact group 90 brings the potentiometer 18 into the regulator circuit. Contactors 89 and 86 are without current and released, causing the contacts 87 and 88 to return the lapping pressure motor to "motor drive," as the potentiometer 17 is out of action, replaced by the potentiometer 18 for the driving gear in the regulator circuit. Setting and variation of the lapping torque are effected by the potentiometer 18 according to the indicator 19 in the same way as described for the driving pinion.

All settings to be carried out once before the start of the lapping operation are thus completed. The automatic lapping cycle is then started by pressing the push button 28 for the automatic control contactors 50 and 54.

By pressing the push button 28, the contactors 52 in the total lapping period timer 50 receive current and close the contacts 73, 74, 75 and 76. The timer 50 remains live through contact 75, the motor 51 starts, and the indicator lamp 53 lights up. The intermittent timer 54 also receives current through 74 and starts running. The contactor 89 at the same time becomes live through contact 76, push button 27 and selector switch 16, and actuates the contacts 90 as described above, bringing the potentiometer 17 (pinion driving)—previously set to the desired torque—into the regulator circuit.

The corresponding indicator lamp 49 lights up, and the contact 91 is opened. The contactor 80 becomes live through the contact 73, closing the contacts 81 and 83, and opening the contacts 82, 84 and 85. Through contacts 75, 83, selector switch 16, and contacts 109 and 100, the contactors 110 and 116 as well as the indicator lamp 118 (forward rotation of the pinion spindle 3) are put under current. The contactor 110 opens contact 111, closes contact 112, connects the main drive motor 7 to the mains through contact 113, closes contact 114 and opens contact 115 to prevent the possibility of inadvertently engaging the hydraulic system by contact with the limit switch 57 and thereby releasing the gears while the machine is running. The main drive motor then starts up in clockwise rotation of the pinion. The contactor 116 connects to the mains through the contact 117 the field winding 61 of the lapping pressure motor 8 for the reverse of the gear spindle 6. The contactor 77 receives current through the contact 114 and connects the rectifier side to the mains through the contacts 87. The motor 41 of the Ward-Leonard set starts running and thus also the lapping pressure motor 8. The contactor 95 receives current together with the contactor 89 through selector switch 16 and switch 25, opening the contact 96 and engaging the motor 10 for the additional movement through the contacts 97.

These functions, taking place within seconds, initiate the lapping operation with pinion driving, continuing until the intermittent timer 54 at the end of the set interval changes the mechanism to gear drive. The circuit to the contactor 89 and indicator lamp 49 is thereby interrupted. The contacts 90 are therefore returned to the position shown for gear drive, the lamp 49 goes out, and the indicator lamp 48 for gear drive is switched on through the contact 91. Contactors 89 and 95 are without current, and the contactor 92 becomes live through selector switch 47, selector switch 16 and switch 25, since the contact 96 is again closed by contactor 95.

The released contactor 95 also opens the contact 97 and closes contact 96. Therefore, contactor 92 again opens contact 93 and again connects, by contacts 94, motor 10 in reverse rotation to the mains. This sequence is repeated at regular intervals until the total lapping time set on the timer 50 has elapsed. The timer then disengages the contactors 52, opening in the first instance the contacts 73, 74, 75 and 76, and consequently causing the release of all contacts and stopping of the lapping machine with the exception of the lamping compound pump (motor 43).

The machine can be stopped at any time by pressing the push button 29. It can be operated by hand through the various push buttons and switches instead of automatically through the push button 28. The controls are rendered automatic, as described above for the change drive, if the direction of rotation is preselected by the switch 16.

While I have described and illustrated a single embodiment of my invention, I wish it to be understood that I do not intend to be restricted solely thereto but that I do intend to cover all modifications thereof which would be apparent to one skilled in the art and which come within the spirit and scope of my invention.

What I claim and desire to secure by Letters Patent is:

1. A lapping apparatus for forming the tooth bearings on a pair of meshing gears comprising a separate drive means for each meshing gear, one of said drive means having a substantially constant speed, the other of said drive means having an adjustably variable speed, a power input means connected to said other drive means, means to adjust the power input to said other drive means to adjust the speed of said other drive means and make the gear driven by said other drive means either the driving gear or the driven gear of said pair of meshing gears, sensing means for measuring the power input to said other drive means after said power input has been so adjusted, and control means actuated by said sensing means for further adjusting the power input to said other drive means to maintain the lapping pressure between said gears predetermined by said first adjustment of said power input means.

2. A lapping apparatus for forming the tooth bearings on a pair of meshing gears comprising a separate drive means for each meshing gear, means for adjusting the relative power inputs to said separate drive means to obtain a predetermined power input differential between said separate drive means corresponding to a desired predetermined lapping pressure between said gears, sensing means for detecting departures from the predetermined differential power input relation of said separate drive means, and means actuated by said sensing means for correcting departures from said predetermined differential relation to maintain said predetermined lapping pressure.

3. A lapping apparatus for forming the tooth bearings on a pair of meshing gears comprising a separate drive means for each meshing gear, one of said drive means having a substantially constant speed, the other of said drive means having an adjustably variable speed, means for adjusting the power input to said other drive means to a predetermined value corresponding to a predetermined lapping pressure between said gears, means for continuously sensing the power input to said other drive means to detect departures from the predetermined value, and control means actuated by said sensing means for adjusting the power input to said other drive means to maintain a predetermined lapping pressure between said gears.

4. A lapping apparatus for forming the tooth bearings on a pair of meshing gears comprising a separate drive means for each meshing gear, one of said drive means having a substantially constant speed, the other of said drive means being a direct current dynamoelectric machine having an adjustably variable speed to drive its gear either faster or slower than the meshing gear driven by the constant speed drive means, a direct current generator connected in power supply relation to said direct current dynamoelectric machine, means for measuring the input power to said direct current dynamoelectric machine, and means actuated by the measuring means and responsive to the measured input power to said direct current dynamoelectric machine for adjusting the power output from said direct current generator to said direct current dynamoelectric machine to maintain a predetermined lapping pressure between said gears.

5. A lapping apparatus as defined in claim 4 including electronic control means responsive to the input power to said direct current dynamoelectric machine for adjusting the power output of said direct current generator.

6. A lapping apparatus for forming the tooth bearings on a pair of meshing gears comprising a separate drive means for each meshing gear, one of said drive means being driven at a substantially constant speed, the other of said drive means being a direct current dynamoelectric machine having an adjustably variable speed to drive its gear either faster or slower than the meshing gear driven by the constant speed drive means, means for measuring the power input to said direct current dynamoelectric machine, a Ward-Leonard system connected in power supply relation to said direct current dynamoelectric machine, and means for adjusting the power output from said Ward-Leonard system to said direct current dynamoelectric machine to maintain a predetermined lapping pressure between said gears.

7. A lapping apparatus as defined in claim 1 in which the power output of said other drive means is small compared to the power output of said one drive means.

8. An apparatus as defined in claim 1 including means for synchronizing the speeds of said separate drive means, measuring means effective to measure the friction force of one of said drive means at the synchronized speed and to measure the algebraic sum of the friction force and lapping pressure at unsynchronized speeds, and means for compensating for the friction force whereby said measuring means measures only the lapping pressure at unsynchronized speeds.

9. A gear lapping machine as defined in claim 1 in which the lapping torque of the gear driven by the variable speed drive is variable within limits which produce torque ratios in the range from 1:1 to 1:10 between the gears being lapped.

10. A gear lapping machine as defined in claim 1 including means for varying the magnitude and direction of the lapping torque, said means being capable of being set and preselected before the start of the lapping operation.

11. A gear lapping machine as defined in claim 1 including an intermittent timer which can be set to effect either a change in the direction of rotation or in the relative driving relation of said separate drive means.

References Cited in the file of this patent

UNITED STATES PATENTS

| | | |
|---|---|---|
| 1,822,846 | Wildhaber | Sept. 8, 1931 |
| 2,147,864 | Thrun | Feb. 21, 1939 |
| 2,641,088 | Wilcox | June 9, 1953 |